United States Patent [19]

Covey

[11] Patent Number: 4,839,771
[45] Date of Patent: Jun. 13, 1989

[54] APPARATUS FOR PROVIDING A LIGHTNING PROTECTIVE VEHICLE SURFACE

[75] Inventor: James H. Covey, Snohomish County, Wash.

[73] Assignee: The Boeing Company, Seattle, Wash.

[21] Appl. No.: 128,992

[22] Filed: Dec. 4, 1987

[51] Int. Cl.$^4$ ............................................. H05F 1/02
[52] U.S. Cl. .................................. 361/218; 361/217; 361/117; 244/1 A
[58] Field of Search ............... 244/1 A, 121, 126; 361/117, 118, 126, 216, 217, 218, 219, 212

[56] References Cited

U.S. PATENT DOCUMENTS

| | | | |
|---|---|---|---|
| 1,243,041 | 10/1917 | Clark | 428/608 |
| 1,243,654 | 10/1917 | Clark | 428/608 |
| 1,243,655 | 10/1917 | Clark | 204/24 |
| 1,308,657 | 7/1919 | Campbell | 244/48 |
| 1,327,707 | 1/1920 | Feary | 428/237 |
| 1,553,087 | 9/1925 | Lehmann | 361/218 |
| 2,325,414 | 7/1943 | McChesney et al. | 361/220 |
| 2,329,366 | 9/1943 | Weill et al. | 361/216 |
| 2,982,494 | 5/1961 | Amason | 361/218 |
| 3,416,027 | 12/1968 | Amason et al. | 361/117 |
| 3,498,572 | 8/1967 | Lumn | 361/218 |
| 3,755,713 | 8/1973 | Paszkowski | 361/218 |
| 3,923,421 | 12/1975 | Carter et al. | 244/1 A X |
| 3,989,984 | 11/1976 | Amason et al. | 361/117 |
| 4,186,237 | 1/1980 | Propp | 361/218 X |
| 4,352,142 | 9/1982 | Olson | 361/218 |
| 4,628,402 | 12/1986 | Covey | 361/218 |
| 4,727,451 | 2/1988 | Covey | 244/1 A |
| 4,755,422 | 7/1988 | Headrick et al. | 361/218 |
| 4,755,904 | 7/1988 | Brick | 361/117 |

Primary Examiner—A. D. Pellinen
Assistant Examiner—Hg26. Williams
Attorney, Agent, or Firm—Seed and Berry

[57] ABSTRACT

An improved composite structure is disclosed for a lightning protective skin member of an aircraft vehicle surface. The skin member includes first and second graphite panels separated by a wire grid. The grid enhances the strength and elasticity of the skin member while also providing a conductive path for lightning current. Each of the graphite panels includes a plurality of graphite plies laminated with an adhesive, preferably epoxy.

17 Claims, 1 Drawing Sheet

APPARATUS FOR PROVIDING A LIGHTNING PROTECTIVE VEHICLE SURFACE

STATEMENT OF GOVERNMENT INTEREST

The government has rights in this invention.

DESCRIPTION

1. Technical Field

The present invention is directed toward materials for use as the surface of a vehicle body, and more particularly, toward an improved composite material to provide a lightning protective skin member for a vehicle body.

2. Background of the Invention

Lightning protection has long been an area of concern for moving vehicles and particularly for aircraft. In addition to providing a lightning protective outer surface, the material needs to meet other requirements of light weight and strength. Many materials have been proposed for providing a structural surface for aircraft which will meet the requirements for lightning protection as well as being strong and lightweight. Among these are composite materials.

Research and development with regard to composite materials have resulted in an increased usage of these materials in aircraft. Composite materials have a high strength-to-weight ratio and can provide a reduction in the empty weight of an aircraft, which results in increased payload capacity. However, the use of composite materials on exterior or lightning-accessible surfaces has presented a special problem with regard to lightning attachment.

Many presently suggested composite materials have electrical conductivities and therefore do not meet requirements for dissipating electrical current caused by a lightning strike. Others have suggested use of a wire mesh to overlay the composite material. While this approach improves the ability of the surface material to dissipate lightning currents, the increase in weight (and concomitant decrease in payload) does not justify use of these materials over more common surface materials, such as aluminum.

It is desirable, therefore, to provide a surface material for aircraft which is lightweight and strong and meets requirements for dissipating lightning currents.

DISCLOSURE OF THE INVENTION

The present invention provides improved lightning protective material for use as the skin member of a moving vehicle. The lightning protective skin member comprises first and second structural panels constructed of a fibrous graphite material in combination with an adhesive. A wire grid is also provided which is constructed of a plurality of wire members arranged at angles to create a grid-like pattern. The wire grid is disposed intermediate the first and second panels to create the structurally improved, lightning protective skin member.

In more preferred embodiments, each of the first and second panels comprises a multiplicity of graphite fibers aligned along the longitudinal axes thereof. The multiplicity of fibers are combined to form a plurality of graphite plies, each having its longitudinal axis aligned with the axes of the fibers which comprise the ply. The plurality of plies are combined in a laminate structure with the adhesive such that a portion of the adhesive is disposed intermediate consecutive ones of the plurality of plies.

In a still further embodiment, a conductive strip is positioned around the periphery of the lightning protective skin member and electrically coupled to the wire members of the wire grid such that all of the wires of the grid are electrically coupled together.

DETAILED DESCRIPTION OF DRAWINGS

Figure 1:
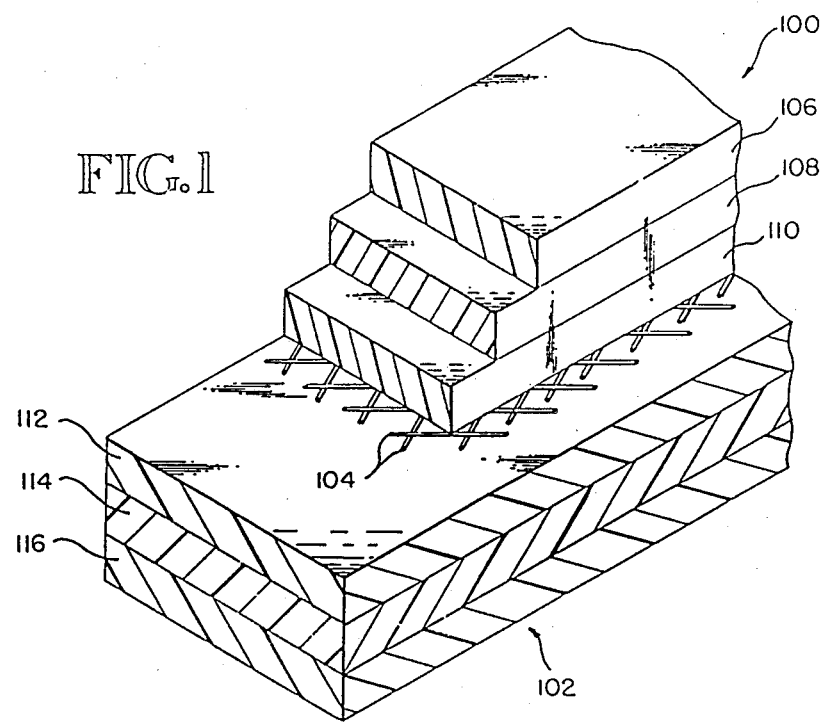
Figure 2:
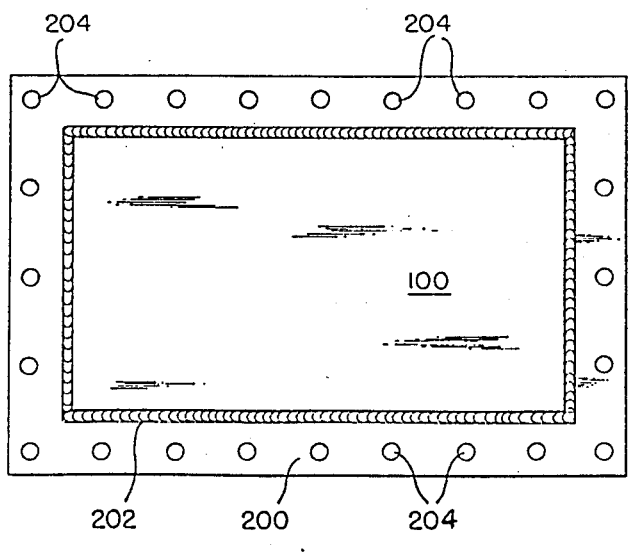

Subject matter which is regarded as the invention is particularly pointed out and distinctly claimed in the numbered paragraphs appended hereto. However, the invention may be best understood by reading the following detailed disclosure in conjunction with the drawings in which:

FIG. 1 is a sectional view of a graphite panel which comprises the novel lightning protective skin member; and FIG. 2 is a plan view of a graphite panel.

DETAILED DESCRIPTION

FIG. 1 illustrates a lightning protective skin member for aircraft which is the subject of the present invention. The lightning protective skin member comprises first and second panels 100 and 102, respectively, having a wire grid disposed therebetween. A plurality of skin members are typically combined to form structural components, which components are combined to provide the surface of an aircraft vehicle. It will be appreciated by those skilled in the art that although the subject invention is described by reference to aircraft vehicles, it is equally applicable to all moving vehicles.

Positioning the wire grid 104 intermediate the two panels 100 and 102 adds strength and elasticity to the overall structure of the skin member. This is in distinction to prior structures which have provided wire meshes and the like attached to the surface of a composite material. Such structures have failed to add mechanical strength or elasticity to the structural skin member. Techniques for fastening graphite structures with metal fasteners are not fully developed, but techniques for fastening metal with metal fasteners are well known.

As will be expected, the wire grid also adds lightning protection to the structural skin member. A lightning strike comprises intense current (approximately 200,000 amps at approximately 200,000 volts) which has a heating effect on the surface of the aircraft if the current is not conducted quickly. The increased heat causes quickly increasing pressures resulting in a shock-wave effect upon the surface of the aircraft. The shockwave stresses the aircraft surface and causes failure.

Further, if the current is not conducted by the surface of the aircraft, the current may be conducted through the passengers of the aircraft, resulting in injury and/or death due to electrocution.

In an effort to reduce increased heat caused by electrical resistance resulting from the intense current and to prevent the current from being conducted by passengers of the aircraft, the current must be quickly distributed over the surface of the aircraft by a less resistive means. If the current is conducted quickly, the current will not increase the temperature of the surrounding air and, accordingly, will not increase pressure or cause shockwaves or destruction of the skin member.

Additionally, providing a conduction path with a conductivity which is substantially higher than the conductivity of the aircraft passengers prevents the current from being conducted through the passengers. The current will be conducted over the surface of the vehicle via the wire grid, which is positioned about the periphery of the skin member. In theory, the current will be transmitted across the aircraft and exit from the side opposite from where it entered.

Although the effectiveness of the wire grid to dissipate current is somewhat decreased by positioning the grid intermediate the two structural panels, the decrease in effectiveness is minimal and far outweighed by the increase in strength and elasticity of the skin member which results by positioning the wire grid intermediate the two panels.

Each lightning protective skin member also includes a conductive strip 200 (FIG. 2) positioned about the periphery of the skin member and electrically connected to the wire grid positioned between the two panels by, for example, welds 202. The strip 200 may include attachment holes 204, or other type bores, for securing the skin member to other structural members of the aircraft. The attachment holes may be positioned at the intersection of the grid with the strip or elsewhere, as shown in FIG. 2.

The conducive strip 200 aids in conducting current over the entire surface of the aircraft such that the current is quickly dissipated. Additionally, by providing attachments at selected intersections of the wire grid, mechanical loads can be effectively transmitted to the strong graphite panels.

The wire grid comprises a plurality of wire members arranged at angles to form a grid-like structure. Preferably, the ends of the wire members are welded or electrically connected to the conductive strip (as shown in FIG. 2) to provide electrical conductivity between each of the wire members of the grid and the conductive strip. Alternatively, the ends of one or more wire members may be connected together and/or to the strip to provide a conduction path between the connected members. In practice, each individual wire in the grid is welded or otherwise electrically fastened to the strip 200.

Further, in the preferred embodiment, the ends of selected wire members are connected to the conductive strip in a manner to create a mechanical connection thereto such that mechanical loads can be readily transmitted to the sturdy graphite panels. It will be appreciated by those skilled in the art, however, that the ends of selected wire members may be connected to provide the mechanical connection without use of the conductive strip.

Each of the two panels 100 and 102 of the skin member is constructed from a plurality of graphite plies, 106, 108, 110, 112, 114 and 116. Each ply of each panel 106-116 comprises a multiplicity of graphite fibers aligned along the longitudinal axes thereof. The plurality of graphite plies each have a longitudinal axis which is aligned with the axes of its constituent fibers. The plurality of plies are combined in a laminate structure with an adhesive. The adhesive is disposed intermediate consecutive ones of the plurality of plies.

As illustrated in FIG. 1, the plurality of plies are also arranged in a manner such that the longitudinal axes of consecutive plies intersect at plus or minus 45-degree angles. In this manner, the strength of the composite graphite material is enhanced.

In a presently preferred embodiment, the panels are constructed of 8 plies laminated to 20 inch square panels. Each ply is constructed from graphite/epoxy tape as is known in the art. The wire grid is constructed of titanium having a diameter of 0.05 inch. The metal strip is also constructed of titanium to prevent corrosion problems which are encountered by using other metals in contact with graphite. The metal strip is approximately 1 inch by 0.05 inch in width and thickness and has a length equal to the perimeter of a panel.

The panels constructed as above survived a 200,000-amp, 200,000-volt strike with noncatastrophic damage. It is noted that with panels constructed in accordance with the above-described invention, the area of lightning contact can be repaired locally without repair of the entire panel.

While only several presently preferred embodiments of my novel construction for lightning protective skin members for vehicle surfaces have been described in detail herein, many modifications and variations may be made without departing from the true scope and spirit of the invention. It is my intent, therefore, to embody all such modifications and variations in the claims appended hereto.

I claim:

1. A lightning protective skin member for a moving vehicle, said lightning protective skin member being made of a composite material and having a relatively high electrical conductivity, said lightning protective skin member comprising:

first and second structural panels constructed of a fibrous material in combination with an adhesive; and a wire grid constructed of a plurality of wire members arranged at angles to create a grid-like pattern, said wire grid being disposed intermediate said first and second panels whereby said wire grid adds structural support to said first and second structural panels and provides a means for dissipating electrical current supplied to said first and second panels.

2. A lightning protective skin member as recited in claim 1 wherein each of said first and second panels comprises a multiplicity of graphite fibers aligned along the longitudinal axes thereof, said fibers being combined to form a plurality of graphite plies, each having its longitudinal axis aligned with the axes of the fibers which comprise said ply, said plurality of plies being combined in a laminate structure with said adhesive such that a portion of said adhesive is disposed intermediate consecutive ones of said plurality of plies.

3. A lightning protective skin member as recited in claim 2 wherein said plurality of plies of said first and second panels are arranged such that the longitudinal axes of consecutive plies are not aligned.

4. A lightning protective skin member as recited in claim 3 wherein the longitudinal axes of consecutive plies are arranged at angles to each other.

5. A lightning protective skin member as recited in claim 4 wherein said angles are at 45 degrees.

6. A lightning protective skin member as recited in claim 1 wherein at least two of said wire members of said grid are coupled to provide electrical continuity between the connected members.

7. A lightning protective skin member as recited in claim 6 wherein each of said first and second panels comprises a multiplicity of graphite fibers aligned along the longitudinal axes thereof, said fibers being combined to form a plurality of graphite plies, each having its longitudinal axis aligned with the axes of the fibers which comprise said ply, said plurality of plies being combined in a laminate structure with said adhesive such that a portion of said adhesive is disposed intermediate consecutive ones of said plurality of plies.

8. A lightning protective skin member as recited in claim 7 wherein all of said plurality of wire members are coupled to provide electrical continuity therebetween.

9. A lightning protective skin member as recited in claim 7 wherein the ends of at least two of said wire members are constructed to provide structural interconnections to other panels of the vehicle.

10. A lightning protective skin member as recited in claim 9 wherein said vehicle comprises an airplane.

11. A lightning protective skin member as recited in claim 9 wherein the longitudinal axes of consecutive plies are arranged at angles to each other.

12. A lightning protective skin member as recited in claim 11 wherein said angles are 45 degrees.

13. A lightning protective skin member as recited in claim 11 wherein said wire members of said grid comprise titanium wires having a diameter of approximately 0.05 inch.

14. A lightning protective skin member as recited in claim 7, further comprising a conductive strip positioned around the periphery of said lightning protective skin member, each of said wire members of said grid being connected to said strip, whereby said strip serves as a mechanical and electrical load path surrounding said grid.

15. A lightning protective skin member as recited in claim 14 wherein said conductive strip is comprised of the same material as said wire members.

16. A method for protecting the composite structure of an aircraft from electrical discharge, comprising the steps of:

providing the aircraft with an exterior skin layer of composite material having an outer side and an inner side;

connecting a conducting grid to the inner side of the exterior skin layer; and connecting an inner skin layer of composite material to the conductive grid, whereby the conductive grid is located intermediate the exterior and inner skin layers so that electrical discharges are dissipated substantially through the conductive grid and the flexibility of the layers is maintained.

17. The method of claim 16, including the step of providing the conductive grid with a conductive peripheral strip connected thereto.

* * * * *